(12) United States Patent  (10) Patent No.: US 8,171,876 B2
Namekawa et al.  (45) Date of Patent: May 8, 2012

(54) APPLICATOR AND METHOD FOR TRANSFERRING DISPERSION LIQUID

(75) Inventors: Takumi Namekawa, Chigasaki (JP); Kei Baba, Chigasaki (JP); Yuya Inoue, Chigasaki (JP); Masao Murata, Chigasaki (JP); Koji Hane, Chigasaki (JP); Robert D. Taff, Pleasanton, CA (US); Robert R. McKay, Pleasanton, CA (US); Ralph D. Fox, Pleasanton, CA (US)

(73) Assignee: Ulvac, Inc., Chigasaki-shi (JP)

( * ) Notice: Subject to any disclaimer, the term of this patent is extended or adjusted under 35 U.S.C. 154(b) by 1045 days.

(21) Appl. No.: 12/149,133

(22) Filed: Apr. 28, 2008

(65) Prior Publication Data

US 2008/0210160 A1  Sep. 4, 2008

Related U.S. Application Data

(63) Continuation of application No. PCT/JP2006/321329, filed on Oct. 26, 2006.

(30) Foreign Application Priority Data

Nov. 10, 2005  (JP) ................................. 2005-325990

(51) Int. Cl.
 *B05C 5/02* (2006.01)
(52) U.S. Cl. ........ 118/300; 118/600; 118/602; 118/603; 118/610; 222/318; 137/563; 137/206; 137/209; 347/84; 347/85; 347/89

(58) Field of Classification Search .................. 118/300, 118/600, 602, 603, 610; 239/124, 127; 222/318; 137/563, 206, 209; 347/84, 85, 92
See application file for complete search history.

(56) References Cited

U.S. PATENT DOCUMENTS

| 5,338,360 | A   |   | 8/1994 | Nilsson |
| 7,867,559 | B2  | * | 1/2011 | Taniguchi et al. ............ 427/240 |
| 7,896,966 | B2  | * | 3/2011 | Masuyama et al. ........... 118/600 |
| 2005/0150449 | A1 |   | 7/2005 | Matsunaga et al. |

FOREIGN PATENT DOCUMENTS

| JP | 8-215626 | 8/1996 |
| JP | 9-75827 | 3/1997 |
| JP | 11-319685 | 11/1999 |
| JP | 2003-275659 | 9/2003 |
| JP | 2003-30000 | 10/2003 |
| JP | 2005-238163 | 9/2005 |

* cited by examiner

*Primary Examiner* — Laura Edwards (74) *Attorney, Agent, or Firm* — Kratz, Quintos & Hanson, LLP (57) ABSTRACT

The present invention provides applicators reducing generating bubble. Dispersion liquid is supplied while the pressure of a circulation tank on the delivery side is lower than the atmospheric pressure but higher than the pressure of the space in buffer tanks. The dispersion liquid in the discharge chambers is recovered while the pressure in a circulation tank serving as recovery destination is lower than the atmospheric pressure. Gas dissolution can be reduced because the dispersion liquid does not come into contact with gases at pressures higher than the atmospheric pressure and engulffing gas or deformation of solid microparticles can be avoided because no pump is used.

6 Claims, 9 Drawing Sheets

APPLICATOR AND METHOD FOR TRANSFERRING DISPERSION LIQUID

The present invention is a Continuation of International Application No. PCT/JP2006/321329 filed Oct. 26, 2006, which claims priority to Japan Patent Document No. 2005-325990, filed on Nov. 10, 2005. The entire disclosures of the prior applications are hereby incorporated by reference herein in their entireties.

BACKGROUND

The present invention generally relates to inkjet spacer applicators, especially to circulating spacer applicators.

Recently, inkjet spacer applicators of which inkjet printer is adapted have been used to apply spacers for liquid crystal display.

Figure 9A:
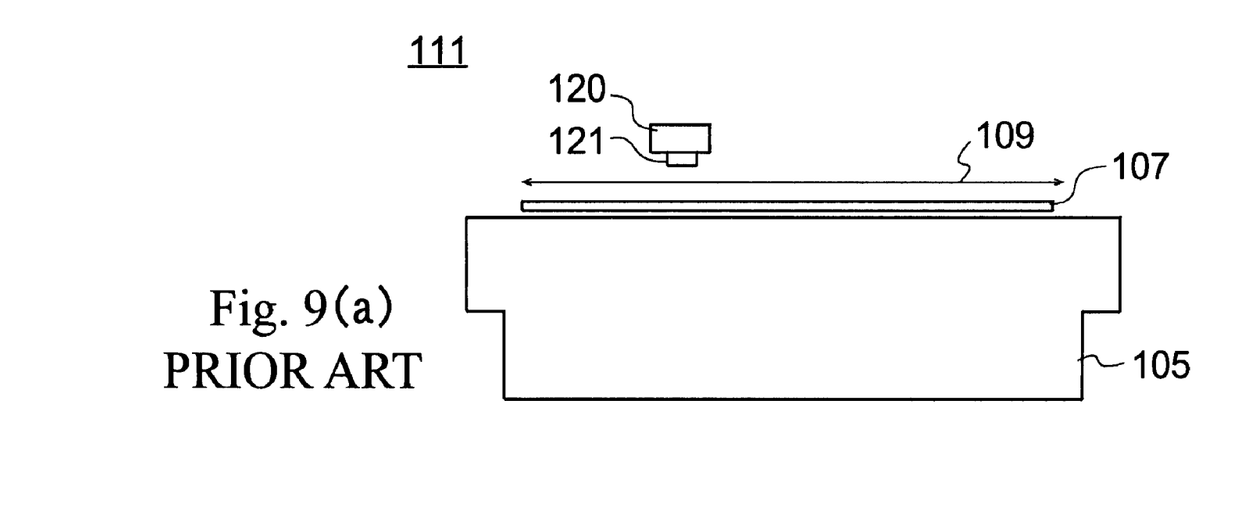
FIG. 9(a) is a schematic illustration of the conventional applicator and FIG. 9(b) is a schematic illustration of an example of the applicator of the present invention.

Reference 111 in FIG. 9(a) represents an example of a spacer applicator having an ink head 121 retained in a holding frame 120 above a platform 105, and a dispersion liquid of which spacers are dispersed is discharged from the ink head 121 while the ink head 121 and substrate 107 for a liquid crystal on the platform 105 are relatively moved along a scanning direction 109, whereby the dispersion liquid lands at a desired position on the surface of the substrate 107 and the spacer is placed there.

Figure 8:
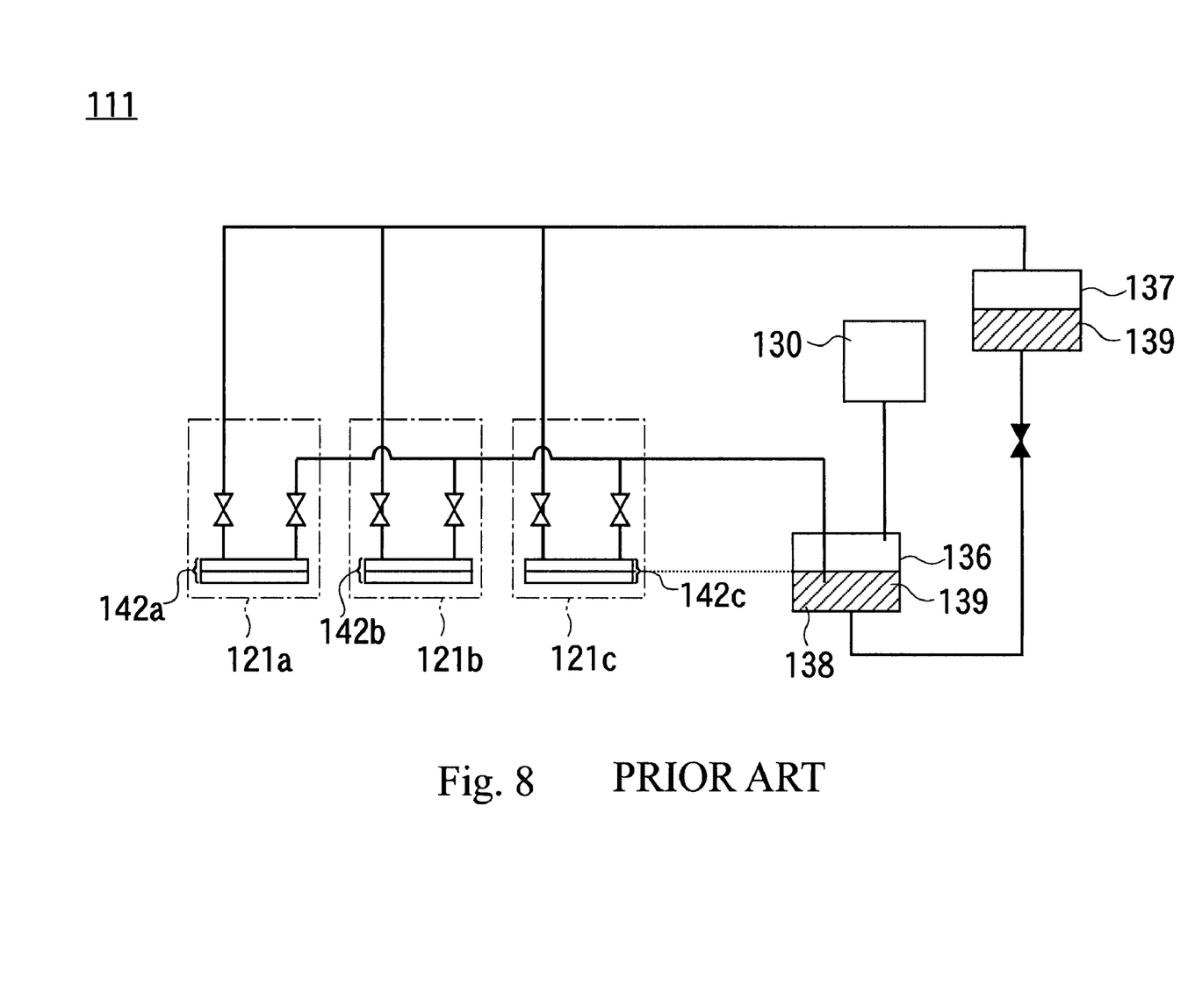
FIG. 8 is a diagram for illustrating the circulation pathway of a dispersion liquid in a conventional applicator.

FIG. 8 is a block diagram for illustrating a system for supplying the dispersion liquid of the conventional spacer applicator 111.

In this spacer applicator 111, the ink head 121 consists of a plurality of head modules 121a to 121c each connected to a feed tank 136 placed at a lateral position with respect to the platform 105.

A dispersion liquid 138 is stored in the feed tank 136 to the same height as the positions of discharge holes of the head modules 121a to 121c, and when valves between the feed tank 136 and the head modules 121a to 121c are opened to connect the feed tank 136 and the head modules 121a to 121c and gas is supplied into the feed tank 136 by a pressurizer 130, the pressure in the feed tank 136 increases so that the dispersion liquid 138 in the feed tank 136 is supplied to the head modules 121a to 121c.

The head modules 121a to 121c are connected to a recovery tank 137 so that the dispersion liquid supplied from the feed tank 136 flow through the head modules 121a-121c and then returns to the recovery tank 137.

The recovery tank 137 and the feed tank 136 are connected to each other, whereby the dispersion liquid 139 recovered in the recovery tank 137 can be returned to the feed tank 136. These conventional art are disclosed in, for example, JPA2004-50059, JPA2002-72218 and JPA11-7028.

SUMMARY OF THE INVENTION

In the conventional applicator 111, gases are readily dissolved in the dispersion liquid 138 because the dispersion liquid is supplied to the head modules 121a to 121c by pressurization as described above, and when the dissolved gas is reduced to bubbles in the head modules 121a-121c, discharge failure may occur.

If the dispersion liquid is supplied by pumping, other problems (such as, engulfing of gas and deformation or damage of the spacer) occur.

In order to solve the problems described above, the present invention provides an applicator for allowing a dispersion liquid of which solid microparticles are dispersed to land at a desired position on a substrate by relatively moving a head module and the substrate, including a first and a second circulation tanks placed outside the head module; a buffer tank provided in the head module; a discharge chamber having an inlet connected to the buffer tank; a main line provided between the first and second circulation tanks and the buffer tank; a return line provided between an outlet of the discharge chamber and the first and second circulation tanks; a feed valve provided on the main line for connecting at least one of the first and second circulation tanks to the buffer tank; and a return valve provided on the return line for connecting at least one of the first and second circulation tanks to the head module. The first and second circulation tanks and the buffer tank are hermetically sealed and the pressure of the space above the dispersion liquid placed in each of the tanks can be controlled.

The present invention also provides the applicator including a gas feed/evacuation system connected to the first and second circulation tanks, wherein the gas feed/evacuation system has a structure supplying a pressurized gas to, and evacuating from a space above the liquid level of the dispersion liquid in the first and second circulation tanks.

The present invention also provides the applicator wherein a vacuum pump and a gas feeding system are connected to the buffer tank in order to control the pressure of the space above the liquid level of the dispersion liquid in the buffer tank.

The present invention also provides the applicator wherein He is supplied from the gas feeding system.

The present invention also provides the applicator including a transfer line provided between the first and second circulation tanks whereby the dispersion liquid can be transferred between the first and second circulation tanks without passing through the discharge chamber.

The present invention also provides the applicator including a filter for separating clusters provided on the transfer line, which allows the individual solid microparticles to pass and catches clusters of the solid microparticles.

The present invention also provides the applicator including a filter for removing solid microparticles provided on the transfer line, which catches the individual solid microparticles.

The present invention also provides the applicator wherein at least a part of the lines through which the dispersion liquid is supplied from the circulation tanks to the discharge chamber consists of a double pipe having a liquid-impermeable and gas-permeable inner pipe through which the dispersion liquid passes and a gas-impermeable outer pipe of which the inner pipe is inserted into, and a clearance between the inner pipe and the outer pipe can be evacuated.

The present invention also provides a method for transferring a dispersion liquid by transferring a circulating liquid in any one of the applicators described above, including when one of the first or second circulation tanks is served as a delivery source, making a pressure inside the circulation tank serving as the delivery source lower than the atmospheric pressure, and opening the feed valve to connect one of the first or second circulation tank serving as delivery source to the buffer tank in order to transfer the dispersion liquid from the circulation tank serving as delivery source to the buffer tank.

The present invention also provides a method for transferring a dispersion liquid by transferring a circulating liquid in any one of the applicators described above, including when one of the first or second circulation tanks is served as a recovery destination, making a pressure inside the circulation tank serving as the recovery destination lower than the atmospheric pressure, and opening the return valve to connect either one of the first or second circulation tanks serving as recovery destination to the discharge chamber in order to transfer the dispersion liquid inside the discharge chamber to the circulation tank serving as recovery destination.

The present invention also provides a method for transferring a dispersion liquid by transferring a circulating liquid in any one of the applicators described above, including opening the feed valve to connect either one of the first or second circulation tanks serving as delivery source to the buffer tank, opening the return valve to connect the other of the first or second circulation tanks serving as recovery destination to the discharge chamber, and transferring the dispersion liquid inside the circulation tank serving as the delivery source to the other circulation tank serving as the recovery destination through the buffer tank and the discharge chamber.

The present invention is constructed as described above, in which the dispersion liquid is supplied from the circulation tank to the buffer tank when the circulation tank and the buffer tank are connected while the pressure in the space above the dispersion liquid in the buffer tank (the space in the buffer tank) is lower than the pressure in the space above the dispersion liquid in the circulation tank (the space in the circulation tank).

When the circulation tank and the discharge chamber are connected to each other, while the force by which the circulation tank sucks the dispersion liquid in the discharge chamber is greater than the force by which the buffer tank aspirates the dispersion liquid in the discharge chamber, the dispersion liquid in the discharge chamber being aspirated into the circulation tank.

Gas dissolution into the dispersion liquid and bubble generating are reduced because the dispersion liquid is not contacted with gases having pressures higher than the atmospheric pressure.

No gas is engulfed into the dispersion liquid by pumping and generating gas can be prevented because no pump is used for transferring the dispersion liquid.

Microparticles dispersed in the dispersion liquid are not deformed or damaged because no pump is used.

No precipitation occurs because the dispersion liquid can be circulated.

DETAILED DESCRIPTION OF THE EMBODIMENTS

Figure 9B:
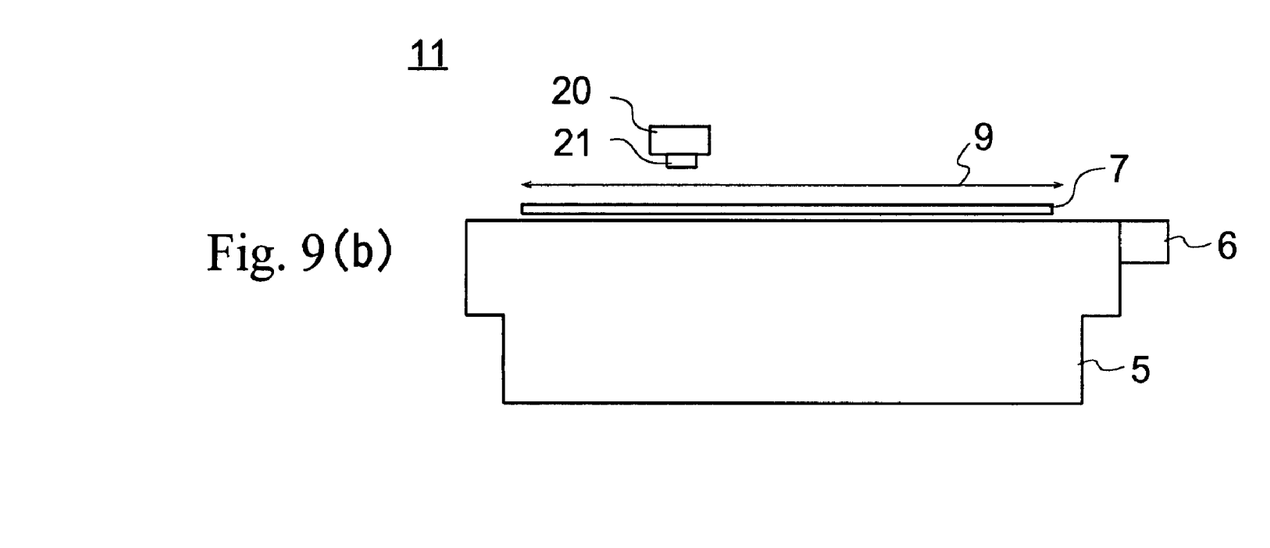

Reference 11 in FIG. 9(b) represents an example of a applicator of the present invention including a platform 5 on which a substrate 7 is mounted.

A holding frame 20 is provided above the platform 5. The holding frame 20 has an ink head 21.

Figure 1:
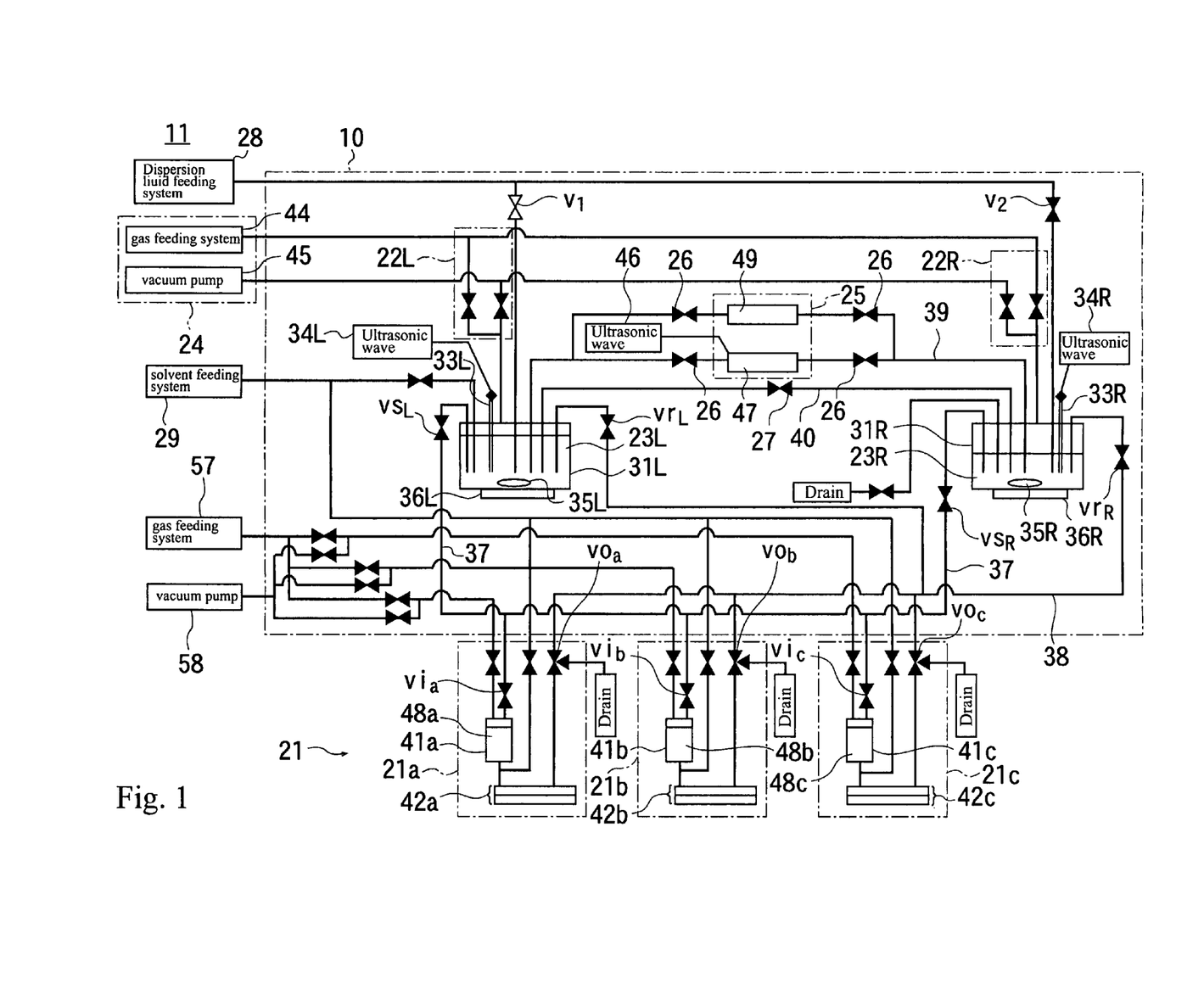
FIG. 1 is a diagram showing the circulation system of a applicator according to an example of the present invention.

As shown in FIG. 1, the ink head 21 includes a plurality of head modules 21a, 21b, 21c. In the head modules 21a to 21c, buffer tanks 41a to 41c and discharge chambers 42a to 42c are provided, respectively.

The applicator 11 has a circulation system supplying a dispersion liquid to the head modules 21a to 21c. Reference 10 in FIG. 1 represents the circulation system, and a first circulation tank 31L and a second circulation tank 31R are provided in the circulation system 10.

The first and second circulation tanks 31L, 31R are placed at positions allowing the substrate 7 to be transported, for example, at lateral positions with respect to or below the platform 5, and they are fixed relative to the platform 5.

The buffer tanks 41a to 41c are placed above the discharge chambers 42a to 42c, and dispersion liquid 48a to 48c of which solid microparticles are dispersed is stored in the buffer tanks 41a to 41c. The dispersion liquid 48a to 48c is contained in the buffer tanks 41a to 41c to the extent that a space is formed above the liquid level of the dispersion liquid 48a to 48c in the buffer tanks 41a to 41c.

A vacuum pump 58 is connected to the ceilings or upper positions of the wall surfaces of each of the buffer tanks 41a to 41c. The vacuum pump is connected to the each buffer tank 41a to 41c at positions above the liquid level of the dispersion liquid in the buffer tanks 41a to 41c so that the pressure of the space above the liquid level of the dispersion liquid 48a to 48c in the buffer tanks 41a to 41c can be decreased by evacuating the space.

A gas feeding system 57 is also connected to the ceilings or upper positions of the wall surfaces of the buffer tanks 41a to 41c. The gas feeding system 57 is connected to the buffer tanks 41a to 41c at positions above the liquid level of the dispersion liquid in the buffer tanks 41a to 41c so that the pressure in the space above the liquid level of the dispersion liquid 48a to 48c in the buffer tanks 41a to 41c can be increased by supplying this space with a pressurized gas less soluble for the dispersion liquid.

The buffer tanks 41a to 41c have feed ports at positions below the liquid level of the dispersion liquid at, for example, bottom portions or lower parts of the wall surfaces thereof, and the discharge chambers 42a to 42c have inlets on their wall surfaces or ceilings.

The feed ports of the buffer tanks 41a to 41c are connected to the inlets of the discharge chambers 42a to 42c, respectively, so that the dispersion liquid in the buffer tanks 41a to 41c can be transferred to the discharge chambers 42a to 42c.

The discharge chambers 42a to 42c are located at such positions that their bottoms face the substrate mounted on the platform 5. The discharge chambers 42a to 42c have a number of discharge holes at their bottoms through which the dispersion liquid in the discharge chambers 42a to 42c are in contact with the atmosphere.

When the pressure $P_B$ of the space in the buffer tanks 41a to 41c is negative pressure ($P_B$<(atmospheric pressure)) and the suction force of the negative pressure is balanced the weight of the dispersion liquid 48a to 48c in the buffer tanks 41a to 41c, the dispersion liquid in the discharge chambers 42a to 42c does not drop from the discharge holes; and therefore, the dispersion liquid 48a to 48c in the buffer tanks 41a to 41c is not transferred to the discharge chambers 42a to 42c.

Each discharge chamber 42a-42c has cells corresponding to the discharge holes, and each cell has a piezoelectric element.

When a voltage is applied to the piezoelectric element, the piezoelectric element expands and contracts by the piezoelectric effect, whereby the dispersion liquid in each cell is pressurized and discharged from the discharge hole of the cell toward the surface of the substrate 7.

When the dispersion liquid in the discharge chamber 42a to 42c is discharged, the dispersion liquid is drawn from the buffer tank 41a to 41c in order to supply to the discharge chamber 42a to 42c with the amount of the dispersion liquid 48a to 48c discharged.

If the liquid level of the dispersion liquid in the buffer tanks 41a to 41c drops, a pressurized gas is introduced into the buffer tanks 41a to 41c from the gas feeding system 57 or the dispersion liquid is supplied from the first circulation tank 31L, or the second circulation tank 31R as described later so that the pressure of the space in the buffer tanks 41a to 41c remains constant.

The transfer of the dispersion liquid from the first or second circulation tanks 31L, 31R to the buffer tanks 41a to 41c is performed by the weight of the dispersion liquid 23L in the first circulation tank 31L or the dispersion liquid 23R in the second circulation tank 31R and the force of difference between the pressure in the first or second circulation tank 31L, 31R and the pressure in the buffer tanks 41a to 41c.

The substrate 7 and the holding frame 20 are arranged in such a manner that either one or both of them may move along a scanning direction 9. The substrate 7 may be stationary while the holding frame 20 may move along the scanning direction 9, or the holding frame 20 may be stationary while the substrate 7 may move along the scanning direction 9. The substrate 7 and the holding frame 20 may move in the same direction or opposite directions along the scanning direction 9. In any case, the ink head 21 moves with the holding frame 20.

As a result, the substrate 7 can move relative to the ink head 21, i.e., relative to the buffer tanks 41a to 41c and the discharge chambers 42a to 42c.

When the substrate 7 and the ink head 21 are relatively moved until the ink head 21 reaches a desired position on the substrate 7, and then a voltage is applied to the piezoelectric element to discharge the dispersion liquid from the discharge hole, the discharged dispersion liquid lands at the desired position on the surface of the substrate 7.

In the dispersion liquid, solid particles (such as, spacer or pigment) are dispersed. After the dispersion solvent included in the landed dispersion liquid is evaporated, the solid particles are fixed on the substrate 7.

Besides the circulation system 10, a dispersion liquid feeding system 28 is provided, and the first and second circulation tanks 31L, 31R are connected to the dispersion liquid feeding system 28.

Valves $v_1$, $v_2$ are provided on the midway of lines connecting the first and second circulation tanks 31L, 31R and the dispersion liquid feeding system 28. When the valves $v_1$, $v_2$ are opened, the dispersion liquid of which the solid microparticles are dispersed is supplied from the dispersion liquid feeding system 28 to the first and second circulation tanks 31L, 31R.

FIG. 1 and the other drawings described later show open valves in white and closed valves in black; and therefore, FIG. 1 shows that the valve $v_1$ connected to the first circulation tank 31L is at an open state as shown by white while the valve $v_2$ connected to the second circulation tank 31R is at a closed state as shown by black.

A gas feed/evacuation system 24 is connected to the first and second circulation tanks 31L, 31R via switches 22L, 22R. The gas feed/evacuation system 24 includes a gas feeding system 44 and a vacuum pump (or evacuation system) 45 so that the first and second circulation tanks 31L, 31R can be independently connected to the gas feeding system 44 and the vacuum pump 45 by switching valves in the switches 22L, 22R. It is also possible to connect one to the gas feeding system 44 and the other to the vacuum pump 45.

The first and second circulation tanks 31L, 31R are connected to the gas feed/evacuation system 24 at their ceilings or upper parts of the wall surfaces above the liquid level of the dispersion liquid 23L, 23R in the first and second circulation tanks 31L, 31R.

The first and second circulation tanks 31L, 31R are hermetically sealed and when they are connected to the gas feeding system 44 via the switches 22L, 22R to supply a pressurized gas from the gas feeding system 44, the pressure of the space in the first and second circulation tanks 31L, 31R increases.

When the first and second circulation tanks 31L, 31R are connected to the vacuum pump 45 via the switches 22L, 22R to evacuate the space above the liquid level of the dispersion liquid 23L, 23R by the vacuum pump 45, the pressure of the space above the liquid level decreases.

The first and second circulation tanks 31L, 31R have feed ports at or near bottom portions thereof below the liquid level of the dispersion liquid 23L, 23R.

Each buffer tank 41a to 41c has an inlet, which is connected to the feed ports of the first and second circulation tanks 31L, 31R via the main line 37. In the figure, the feed ports are the ends of the main lines.

A first feed valve $vs_L$ and a second feed valve $vs_R$ are provided on the pathway of the main line 37 near the feed ports of the first and second circulation tanks 31L, 31R and inlet valves $vi_a$-$vi_c$ are provided at positions nearer to the inlets of the buffer tanks 41a to 41c than the first and second feed valves $vs_L$, $vs_R$. When either one of the first and second feed valves $vs_L$, $vs_R$ is opened while the other is closed and the inlet valve $vi_a$-$vi_c$ of the head module 21a to 21c to be fed is opened, the first or second circulation tank 31L, 31R connected to the opened first or second feed valve $vs_L$, $vs_R$ serves as delivery source and the buffer tank 41a to 41c connected to the opened inlet valve $vi_a$-$vi_c$ serves as delivery destination so that the delivery source and the delivery destination are connected.

The pressure $P_S$ of the space in the first and second circulation tanks 31L, 31R can be controlled by supplying a pressurized gas, and if the pressure $P_s$ of the space in the first or second circulation tank 31L, 31R serving as delivery source has been preliminarily increased higher than the pressure $P_B$ of the space in the buffer tank 41a to 41c ($P_B$<$P_S$), the dispersion liquid 23L, 23R in the first or second circulation tank 31L, 31R serving as delivery source flows into the buffer tank 41a to 41c serving as delivery destination via the main line 37.

Once a predetermined amount of the dispersion liquid 48a to 48c has been stored in the buffer tank 41a to 41c, the buffer tank 41a to 41c is ready to supply the dispersion liquid to the discharge chamber 42a to 42c.

Even if the pressurized gas is supplied to the first or second circulation tanks 31L, 31R, the inside pressure $P_s$ is not higher than the atmospheric pressure ($P_s$≦atmospheric pressure); as a result, the pressurized gas is not dissolved into the dispersion liquid.

When the discharge chamber 42a to 42c is filled with the dispersion liquid, it is possible to discharge the dispersion liquid onto the surface of the substrate 7.

Next, downstream side from the discharge chambers 42a to 42c will be explained.

Each discharge chamber 42a to 42c has an outlet, and each of first and second circulation tanks 31L, 31R has an inlet. A return line 38 is provided between the outlet of the discharge chamber 42 and the inlets of the first and second circulation tanks 31L, 31R. In the figure, the inlets are the ends of the return line 38.

The return line 38 has outlet valves $vo_a$-$vo_c$ near the outlets of the discharge chambers 42a to 42c, respectively, and a first return valve $vr_L$ and a second return valve $vr_R$ positioned nearer to the outlets of the first and second circulation tanks 31L, 31R than the outlet valves $vo_a$-$vo_c$.

The return valves $vr_L$, $vr_R$ are valves for connecting at least one of the first and second circulation tanks to the head modules 21a to 21c. When either one of the first and second feed valves $vs_L$, $vs_R$ is opened and the other is closed, the first or second circulation tank 31L, 31R connected to the closed feed valve $vs_L$ or $vs_R$ serves as recovery destination, and when the return valve $vr_L$ or $vr_R$ of the first or second circulation tank 31L, 31R serving as recovery destination is opened and the desired outlet valve $vo_a$ to $vo_c$ is opened, the discharge chamber 42a, 42b or 42c connected to the opened outlet valve $vo_a$, $Vo_b$ or $vo_c$ serves as return source so that the discharge chamber 42a, 42b or 42c serving as return source and the first or second circulation tank 31L, 31R serving as recovery destination are connected. If all of the outlet valves $vo_a$-$vo_c$ are opened, each discharge chamber 42a to 42c serves as return source.

In this situation, if the dispersion liquid in each discharge chamber 42a to 42c is in contact with the atmosphere in the discharge holes, the dispersion liquid in the discharge chamber 42a to 42c serving as return source can be transferred to the first or second circulation tank 31L, 31R serving as recovery destination by decreasing the pressure $P_R$ in the first or second circulation tank 31L, 31R serving as recovery destination below the atmospheric pressure ($P_R$<(atmospheric pressure)).

The dispersion liquid can be made to flow from the inlet to the outlet in the discharge chamber 42a to 42c and then, the dispersion liquid can be transferred to the circulation tank 31L, 31R serving as recovery destination by decreasing the pressure of the first or second circulation tank 31L, 31R serving as recovery destination lower than the pressure in the buffer tank 41a to 41c and decreasing the pressure at the outlet of the discharge chamber 42a to 42c lower than the pressure at the inlet of the discharge chamber 42a to 42c.

The outlet valves $vo_a$-$vo_c$ are three-way valves, so that the outlet valves $vo_a$-$vo_c$ can connect not only the discharge chamber 42a to 42c to the first or second circulation tank 31L, 31R but also the discharge chamber 42a to 42c to drains.

The applicator 11 of the present invention has a level sensor detecting the height of the liquid level of the dispersion liquid 48a to 48c in the buffer tanks 41a to 41c and a pressure sensor measuring the pressure in the space above the liquid level of the dispersion liquid 48a to 48c in the buffer tanks. Any change in the liquid level in the buffer tanks 41a to 41c or any change of the pressure in the space above the liquid level is detected so that the dispersion liquid is added from the first or second circulation tank 31L, 31R in order to maintain a constant liquid level, or a pressurized gas is introduced from the gas feeding system 57, or the buffer tank 41a to 41c is evacuated by the vacuum pump 58 in order to maintain a constant pressure, whereby the dispersion liquid 48a to 48c in the buffer tanks 41a to 41c is prevented from dropping from the discharge holes of the discharge chambers 42a to 42c.

When a part or all of the dispersion liquid in the discharge chambers 42a to 42c is transferred to the first or second circulation tank 31L, 31R serving as recovery destination, the dispersion liquid in the buffer tanks 41a to 41c is transferred to the discharge chambers 42a to 42c. In this case, the liquid level of the dispersion liquid 48a to 48c in the buffer tanks 41a to 41c is lowered and the pressure in the space in the buffer tanks 41a to 41c decrease.

In this case, since the dispersion liquid in the first or second circulation tank 31L, 31R serving as delivery source can be transferred to the buffer tanks 41a to 41c, then the dispersion liquid can be transferred from the first or second circulation tank 31L or 31R serving as delivery source to the first or second circulation tank 31L or 31R serving as recovery destination through the buffer tanks 41a to 41c and discharge chamber 42a to 42c.

During this operation, the pressure of the inner space in the buffer tanks 41a to 41c can be maintained at a predetermined value.

Figure 2:
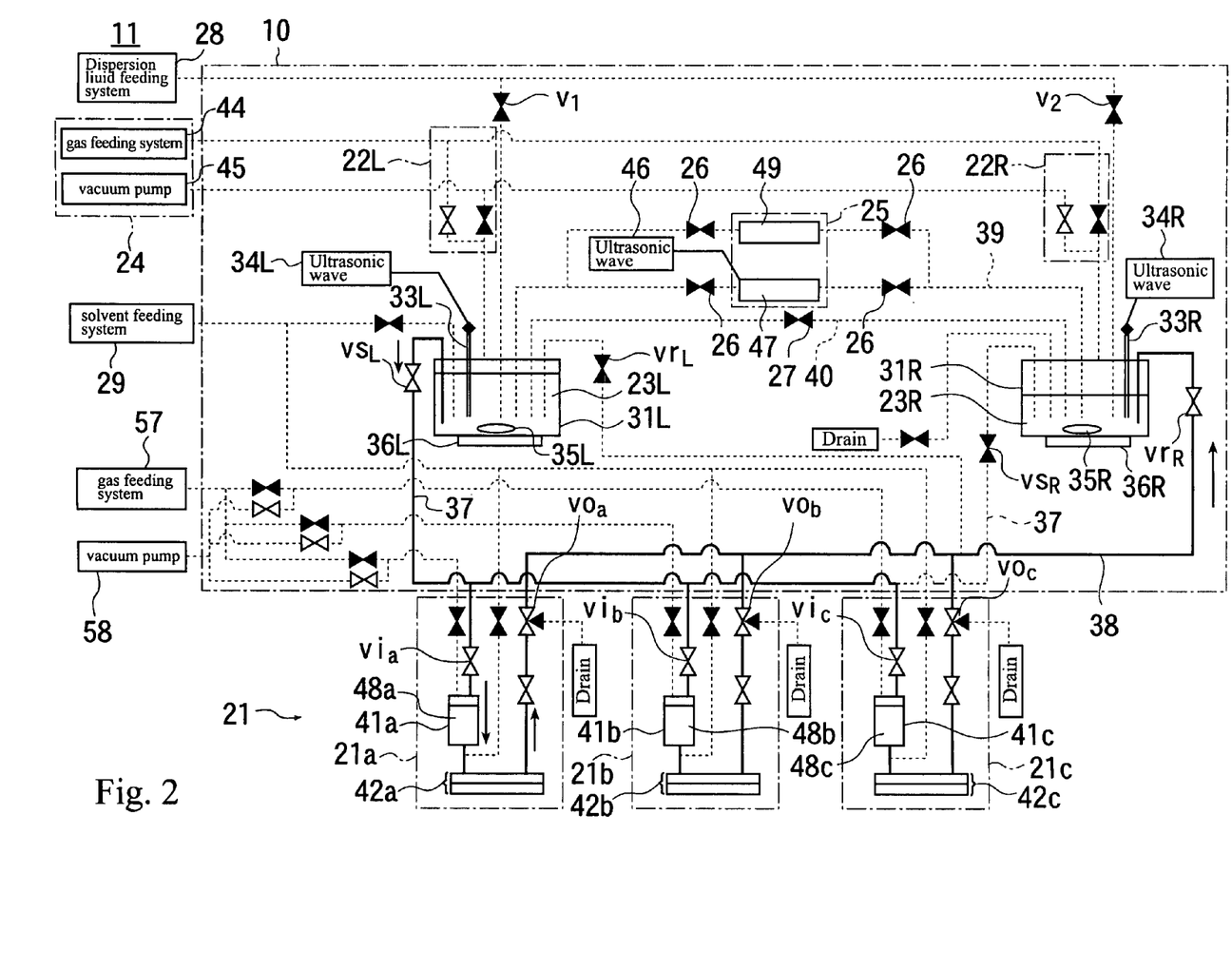
FIG. 2 is a diagram for illustrating a route along which a dispersion liquid flows from a first circulation tank to a second circulation tank.

FIG. 2 shows the state in which the dispersion liquid flows from the first circulation tank 31L serving as delivery source to the second circulation tank 31R serving as recovery destination (i.e., the first feed valve $vs_L$ and the second return valve $vr_R$ are opened and the second feed valve $vs_R$ and the first return valve $vr_L$ are closed). The dispersion liquid flows from the first circulation tank 31L to the second circulation tank 32R.

FIG. 2 and FIGS. 3 to 5, described later, are diagrams for illustrating the flow of the dispersion liquid, in which the lines through which the dispersion liquid flow are shown by solid lines while the other lines are shown by dashed lines.

Figure 3:
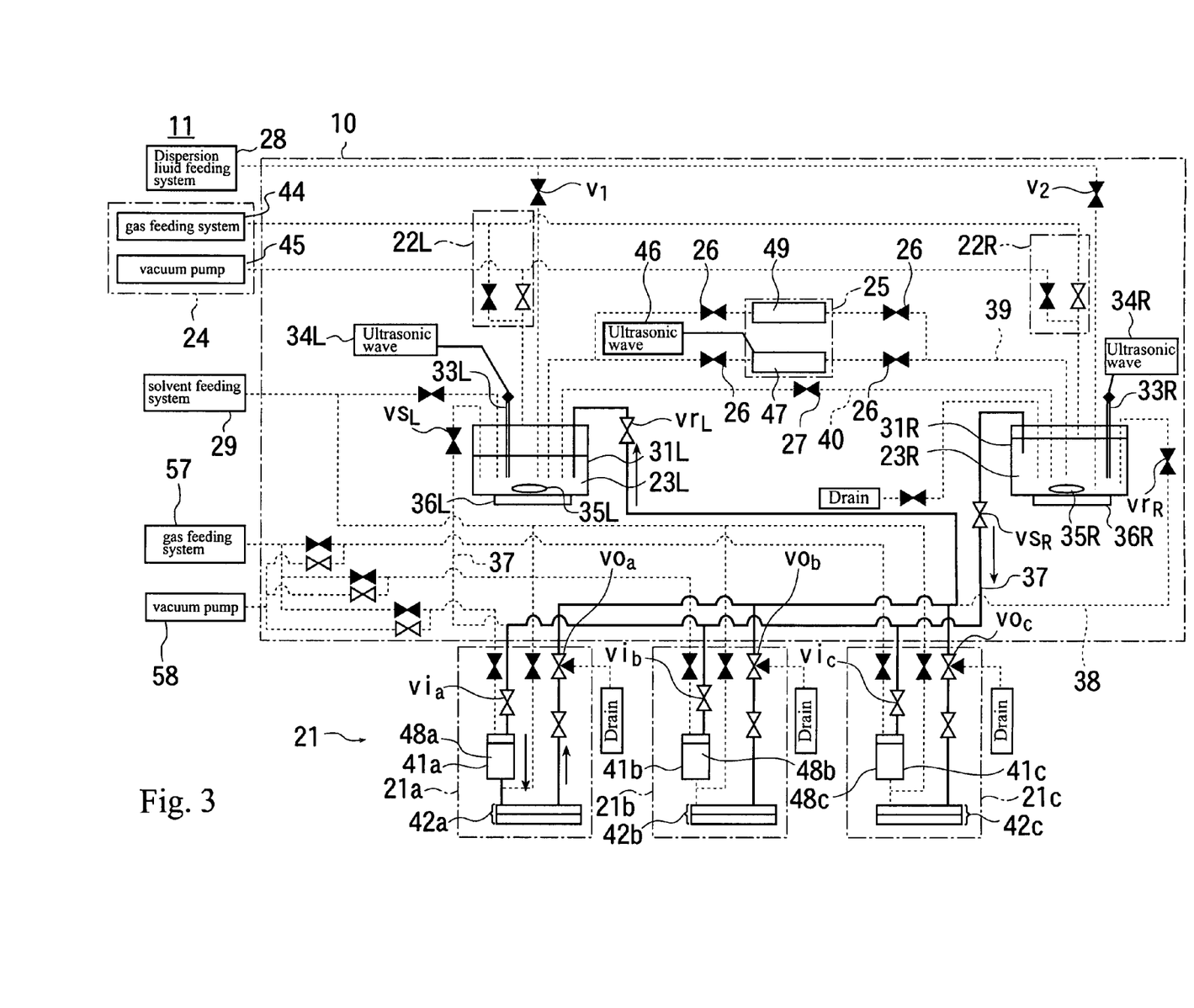
FIG. 3 is a diagram for illustrating a route along which dispersion liquid flows from the second circulation tank to the first circulation tank.

In contrast to FIG. 2, FIG. 3 shows the state in which the dispersion liquid flows from the second circulation tank 31R serving as delivery source to the first circulation tank 31L serving as recovery destination when the first feed valve $vs_L$ and the second return valve $vr_R$ are closed and the second feed valve $vs_R$ and the first return valve $vr_L$ are opened.

Next, the pathway along which the dispersion liquid is directly transferred between the first and second circulation tanks 31L, 31R is explained.

The first and second circulation tanks 31L, 31R have first and second transfer ports at positions below the liquid level of the dispersion liquid 23L, 23R in the first and second circulation tanks 31L, 31R.

Since the first and second transfer ports are connected to each other by a transfer line 39, which is distinct from the main line 37 and the return line 38, the inside of the first and second circulation tanks are connected by the transfer line 39. In this example, the first and second transfer ports consist of the end of the transfer line 39.

The valves provided on the main line 37 or return line 38 are closed to cut off the connection between the first and second circulation tanks 31L, 31R and the buffer tanks 41a to 41c via the main line 37 or the connection between the first and second circulation tanks 31L, 31R and the discharge chambers 42a to 42c via the return line 38.

Open-close valves 26 are provided on the transfer line 39, and the open-close valves 26 are closed to provide a pressure difference between the inside of the first circulation tank 31L and the inside of the second circulation tank 31R by the gas feed/evacuation system 24. The first or second circulation tank 31L, 31R on the higher pressure side serves as transfer source and the first or second circulation tank 31L, 31R on the lower pressure side serves as transfer destination, and then the open-close valves 26 are opened, whereby the dispersion liquid flows from the first or second circulation tank 31L, 31R serving as transfer source toward the first or second circulation tank 31L, 31R serving as transfer destination.

A filter system 25 is provided on the halfway of the transfer line 39. The filter system 25 includes a filter for separating clusters 47 and a filter for removing solid microparticles 49. The filter for separating clusters 47 and the filter for removing solid microparticles 49 are in parallel between the first and second circulation tanks 31L, 31R so that the dispersion liquid can be transferred between the first and second circulation tanks 31L, 31R through either one of filters (47 or 49) or both filters (47, 49).

Solid microparticles dispersed in the dispersion liquid may gather to form clusters having large particle sizes during circulation in lines or storage in tanks (such as, the circulation tanks 31L, 31R), but the clusters are caught on the filter for separating clusters 47 and removed when the dispersion liquid passes through the filter for separating clusters 47 because the filter for separating clusters 47 has a mesh size larger than the solid microparticles but smaller than the clusters of the solid microparticles.

The filter for separating clusters 47 is also connected to an ultrasonic wave generator 46 that applies ultrasonic waves to the filter for separating clusters 47.

When ultrasonic waves are applied to the filter for separating clusters 47, the clusters caught on the filter for separating clusters 47 separate into individual solid microparticles and pass through the filter for separating clusters 47, whereby the dispersion liquid is regenerated during circulation in the transfer line 39 because the clusters are decomposed.

Figure 4:
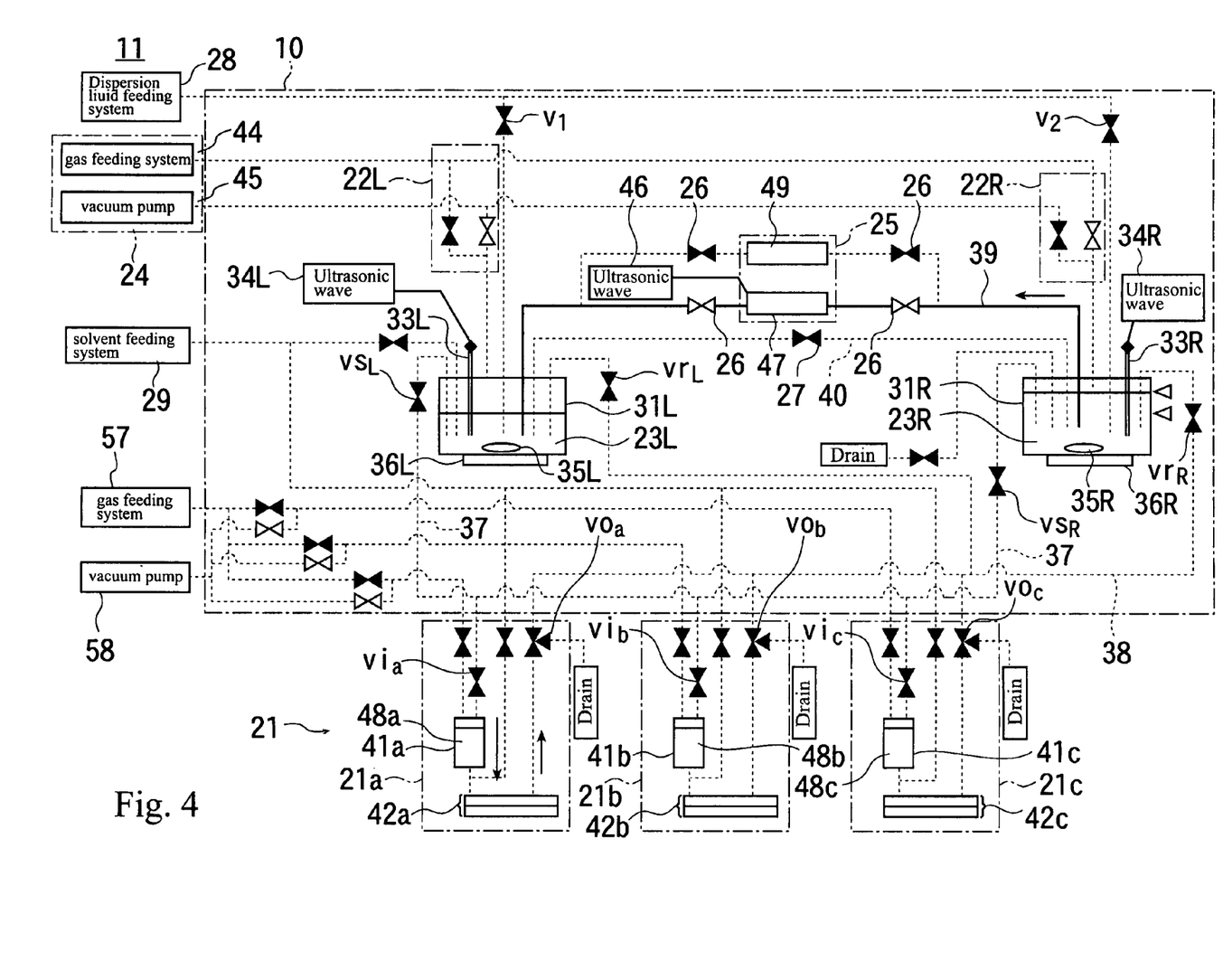
FIG. 4 is a diagram for illustrating a dispersion liquid flowing through a filter for separating clusters.

FIG. 4 shows the state in which the dispersion liquid flows through the filter for separating clusters 47 in the transfer line 39 from the second circulation tank 31R toward the first circulation tank 31L. The dispersion liquid recovered by the first or second circulation tank 31L, 31R serving as recovery destination can be returned to the first or second circulation tank 31L, 31R serving as delivery source while it is reclaimed.

Figure 5:
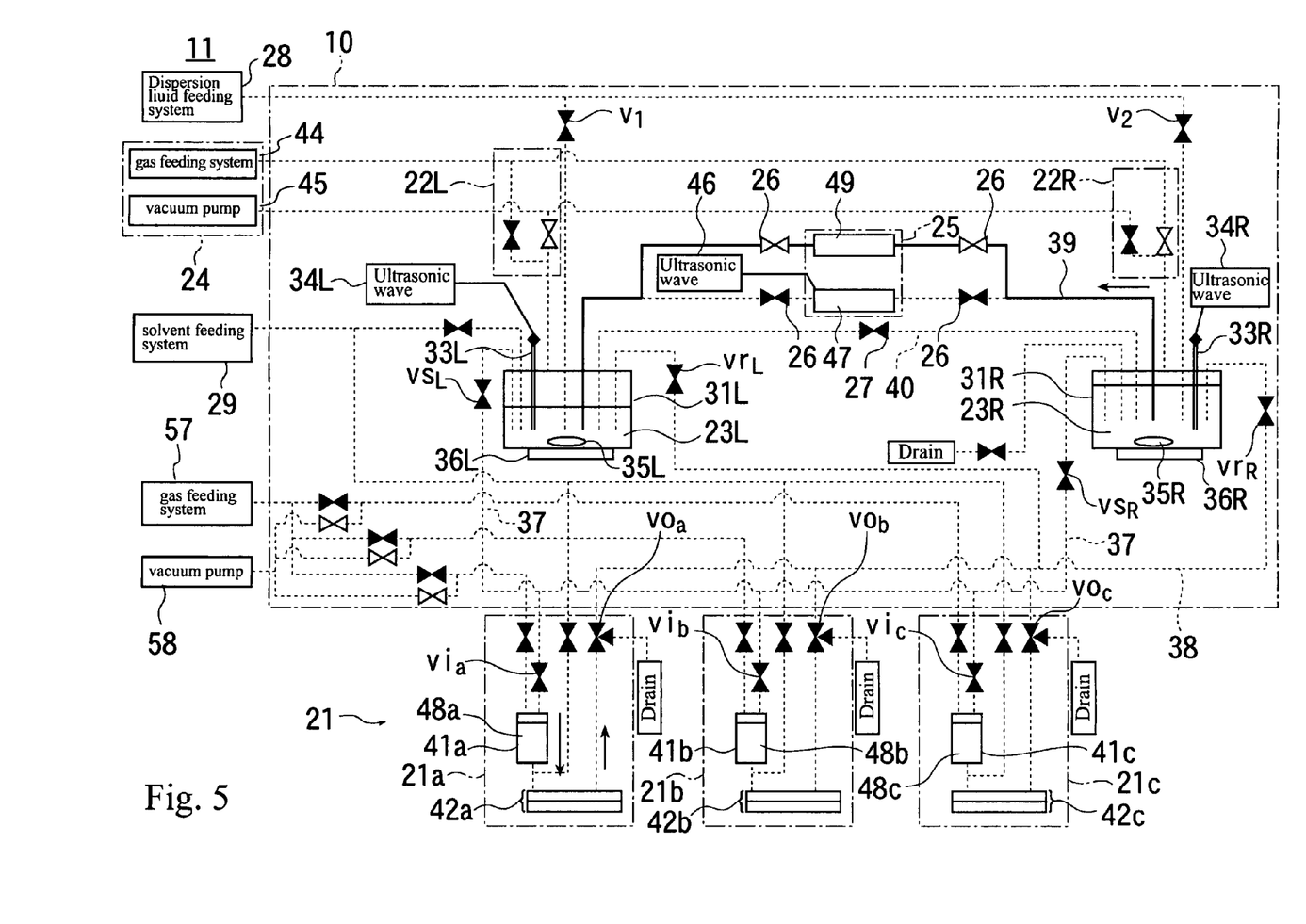
FIG. 5 is a diagram for illustrating a dispersion liquid flowing through a filter for removing solid microparticles.

The dispersion liquid flowing through the transfer line 39 can also pass through the filter for removing solid microparticles 49 in parallel to the filter for separating clusters 47 instead of passing through the filter for separating clusters 47 by manipulating the open-close valves 26 on the transfer line 39.

FIG. 5 shows the state in which the dispersion liquid flows through the filter for removing solid microparticles 49 in the transfer line 39 from the second circulation tank 31R toward the first circulation tank 31L.

Solid microparticles contained in the dispersion liquid cannot pass through the filter for removing solid microparticles 49 because the filter for removing solid microparticles 49 has a mesh size smaller than the microparticles. Thus, the solid microparticles are totally caught on the filter for removing solid microparticles 49 when the dispersion liquid passes through the filter for removing solid microparticles 49.

The applicator 11 should be adaptable to multiple types of dispersion liquids, such as, dispersion liquids of which microparticles of different materials are dispersed or dispersion liquids of which microparticles of different particle sizes are dispersed.

The procedure for changing the dispersion liquid using the filter for removing solid microparticles 49 is explained as follows. In order to change the dispersion liquid circulated in the applicator 11 and discharged from the ink head 21, it is necessary to first remove the dispersion liquid in the lines 37 to 39 and the dispersion liquid in the tanks 31L, 31R, 41a to 41c from drains or the like and wash the lines 37-39 and each tanks 31L, 31R, 41a to 41c, and then supply another type of dispersion liquid from the dispersion liquid feeding system 28 to the first and second circulation tanks 31L, 31R.

In this applicator 11, the solvent feeding system 29 is connected to either one or both of the first and second circulation tanks 31L, 31R. In this example, it is connected to the first circulation tank 31L, and the valve between the solvent feeding system 29 and the first circulation tank 31L is opened to supply a washing liquid to the first circulation tank 31L from the solvent feeding system 29 after the dispersion liquid in the each tanks 31L, 31R, 41a to 41c and head modules 21a to 21c and lines 37-39 has been discharged into drains and before another dispersion liquid is placed in the first and second circulation tanks 31L, 31R, whereby the washing liquid is transferred instead of the dispersion liquid to the second circulation tank 31R via the buffer tanks 41a to 41c and head modules 21a to 21c, and the washing liquid is returned from the second circulation tank 31R to the first circulation tank 31L via the transfer line 39.

Thus, the inside of the tanks 31L, 31R, 41a to 41c and lines 37 to 39 are washed and microparticles are removed by supplying a washing liquid (solvent) to either one of the first or second circulation tank 31L, 31R or both and circulating it in the same manner as the dispersion liquid.

After the washing liquid has been discharged from drains, a fresh dispersion liquid is placed in the first and second circulation tanks 31L, 31R so that the solid microparticles in the previous dispersion liquid cannot mix the fresh dispersion liquid.

Before the dispersion liquid is discharged into drains and replaced with a washing liquid, microparticles in the dispersion liquid to be replaced are removed by the filter 49 for removing solid microparticles, and the dispersion liquid solvent is circulated, whereby the inside of the lines is first washed with the dispersion liquid solvent of the dispersion liquid. Then, the dispersion liquid solvent is discharged followed by washing with a washing liquid, whereby the washing liquid can be saved.

In this example, a bypass line 40 connecting the first and second circulation tanks 31L, 31R by detouring around the filter system 25 is provided in parallel to the transfer line 39 of which the filter system 25 is provided midway its line.

The bypass line 40 has an open-close valve 27. When the open-close valve 27 is closed, the dispersion liquid does not flow through the bypass line 40, and when the open-close valve 27 on the bypass line 40 is opened while the open-close valves 26 on the transfer line 39 are closed, the dispersion liquid flows through the bypass line 40 under a pressure difference in the space in the first and second circulation tanks 31L, 31R. Each bypass port provided in the first and second circular tanks 31L and 31R, which are connected to the bypass line 40, is arranged below the liquid level of the first and second circulation tanks 31L, 31R.

A washer 6 is provided at a lateral position with respect to the platform 5, and a washing liquid or dispersion liquid solvent can also be circulated while the discharge holes are blocked with the washer 6 by moving the ink head 21 from a position above the substrate 7 to a position above the washer 6.

A gas feeding system 57 is connected to the buffer tanks 41a to 41c via valves. When the ink head 21 is moved from a position above the substrate 7 to the washer 6 and then the outlet valves $vo_a$ to $vo_c$ on the return line 38 are closed, and valves provided between the gas feeding system 57 and the buffer tanks 41a to 41c are opened and purge gas is introduced into buffer tanks 41a to 41c while the discharge holes are opened, the pressure inside the buffer tanks 41a to 41c are introduced at atmospheric pressure or higher than atmospheric pressure. Consequently, the dispersion liquid or washing liquid in the buffer tanks 41a to 41c can be discharged from the discharge holes of the head modules 21a to 21c into the washer 6.

As explained above, in the applicator 11 of the present invention, when one of the first and second circulation tanks 31L, 31R is served as the delivery source and the other of the first or second circulation tank 31L, 31R is served as recovery destination, flowing from the first or second circulation tanks 31L, 31R serving as delivery source to the other of the first or second circulation tanks 31L, 31R serving as recovery destination, further returning to the first or second circulation tank serving as the delivery source, the dispersion liquid can flow through the buffer tanks 41a to 41c and the discharge chamber 42a to 42c. Consequently, it is possible to prevent sinking of solid microparticles in the discharge chamber 42a to 42c or inside of lines.

If the dispersion liquid in the first or second circulation tank 31L, 31R serving as recovery destination has increased, the first or second circulation tank 31L, 31R can be in turn used as delivery source to circulate the dispersion liquid via the buffer tanks 41a to 41c to the discharge chambers 42a to 42c and the dispersion liquid can be returned to the first or second circulation tank 31L, 31R serving as delivery source through the filter for separating clusters 47.

The first and second circulation tanks 31L, 31R include ultrasonic wave oscillators 33L, 33R, respectively. When ultrasonic waves are applied from ultrasonic wave generators 34L, 34R to the ultrasonic wave oscillator 33L, 33R to allow them to ultrasonically oscillate, the dispersion liquid in the first and second circulation tanks 31L, 31R ultrasonically oscillates; thereby, preventing clustering of solid microparticles and dispersing clusters that have already formed.

The first and second circulation tanks 31L, 31R also include rotors 35L, 35R each having a magnet. Below the bottom portions of the first and second circulation tanks 31L, 31R, stirrers 36L, 36R magnetically linked to the rotors 35L, 35R are provided. When the stirrers 36L, 36R are actuated, the rotors 35L, 35R rotate at a desired speed to stir the dispersion liquid in the first and second circulation tanks 31L, 31R. It is possible to prevent precipitation of solid microparticles.

The part of each line 37-40 described above, especially of the main line 37 where the dispersion liquid is supplied from the first and second circulation tanks 31L, 31R to the discharge chambers 42a to 42c can totally or partially consist of a double pipe in order to degas the dispersion liquid flowing through the double pipe. The double pipe is desirably placed immediately before the position where the dispersion liquid is discharged, i.e., between the buffer chambers 41a to 41c and the discharge chambers 42a to 42c.

Figure 7:
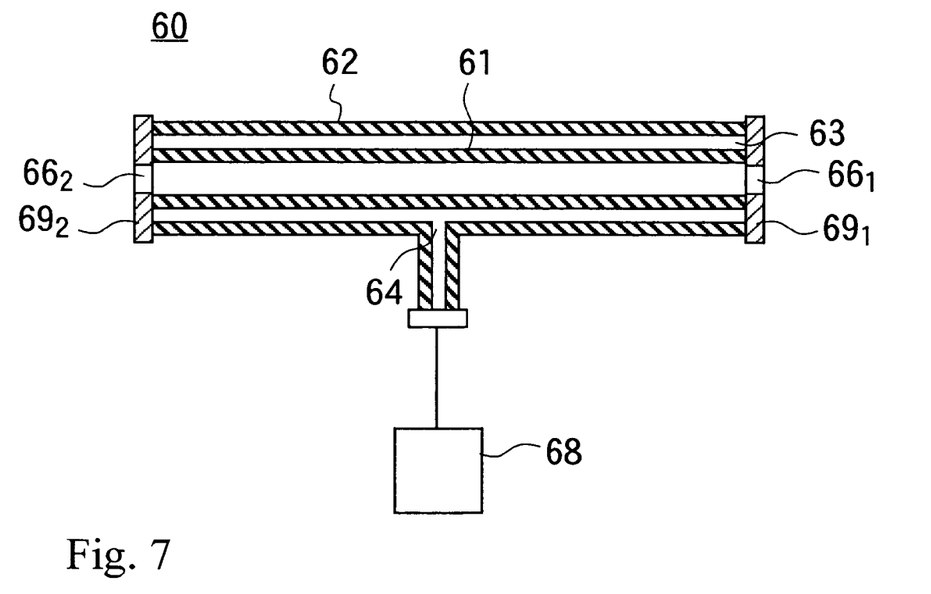
FIG. 7 is a diagram for illustrating a deaeration unit consisting of a double pipe.

Reference number 60 in FIG. 7 represents the double pipe for degassing. This double pipe 60 has an inner pipe 61 and an outer pipe 62 placed around the inner pipe 61 to surround the periphery of the inner pipe 61. The inner pipe 61 is inserted into the outer pipe 62.

The inner pipe 61 is made of a gas-permeable and liquid-impermeable resin (such as PTFA, etc.), and the outer pipe 62 is a pipe made of a gas-impermeable and liquid-impermeable metal (SUS). The inner and outer pipes 61, 62 are flexible and can be bent.

Connecting members $69_1$, $69_2$ for connecting to other lines are provided between the ends of the inner pipe 61 and the ends of the outer pipe 62, and the clearance 63 between the inner pipe 61 and outer pipe 62 is blocked by the connecting members $69_1$, $69_2$ at both ends of the inner pipe 61 and therefore hermetically sealed.

The outer pipe 62 has an exhaust port 64, which is connected to a vacuum pump 68 so that the clearance 63 can be evacuated.

When the clearance 63 is evacuated during circulation of the dispersion liquid from one to the other of both ends $66_1$, $66_2$ of the inner pipe 61, the gases dissolved in the dispersion liquid are sucked into the clearance 63 through the inner pipe 61 so that gasses are removed from the dispersion liquid.

He gas is used as the pressurized gas described above and the low solubility of He gas reduces generating bubble.

Although two feed valves $vs_L$, $vs_R$ are provided in the foregoing description, the number of the valves may be one or more than two as long as either one or both of the first and second circulation tanks 31L,31R can be connected to the main line 37.

Similarly, the number of return valves $vr_L$, $vr_R$ is not limited to two, but any number of the valves may be used so far as either one or both of the first and second circulation tanks 31L,31R can be connected to the return line 38.

Figure 6:
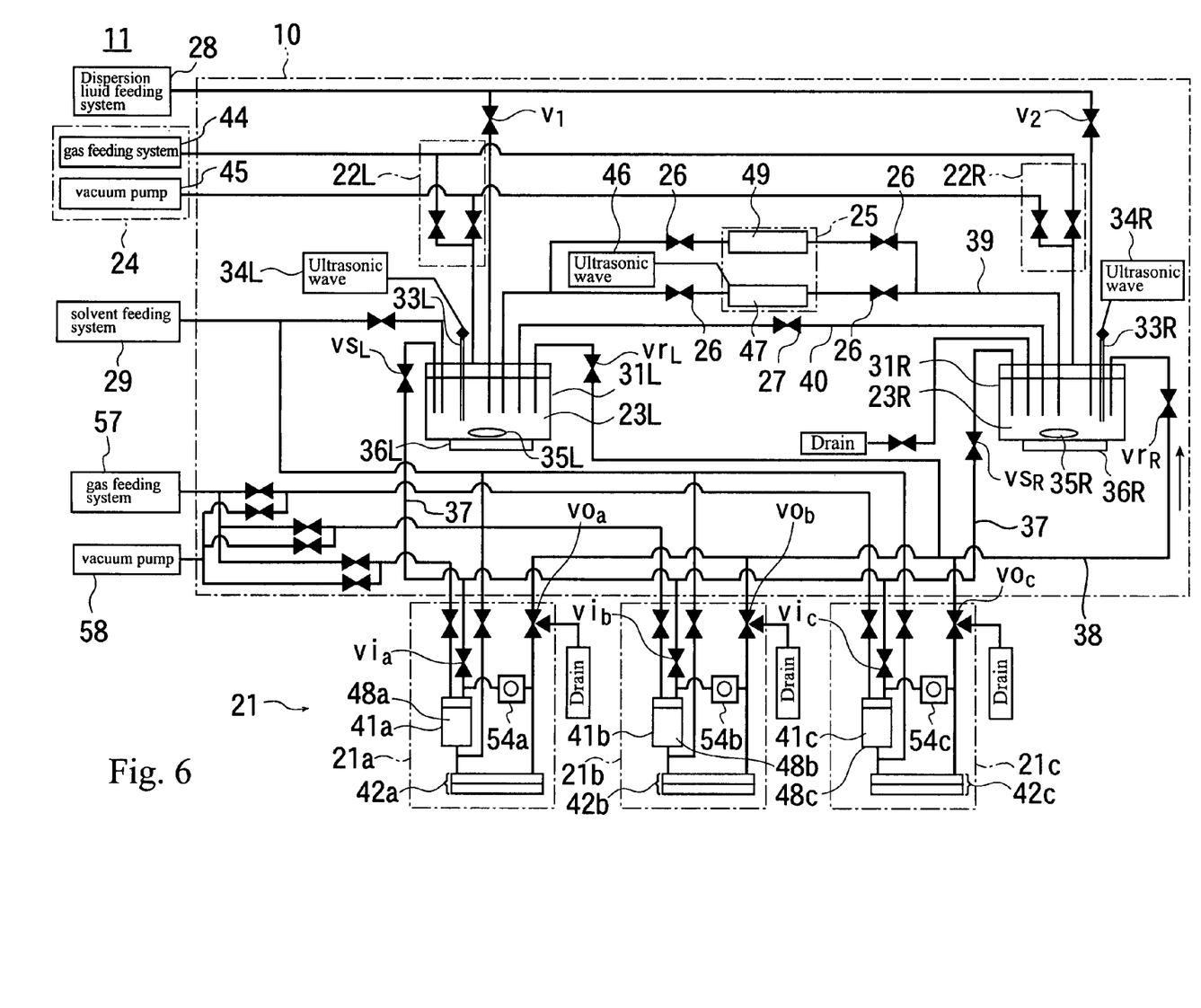
FIG. 6 is a diagram for illustrating the applicator that returns dispersion liquid from discharge chambers directly to buffer tanks.

As shown in FIG. 6, when pumps which do not engulf gas are connected between the return line 38 at the downstream from the discharge chamber 42a to 42c and main line 37 positioned between the buffer tanks 42a to 42c and the first or second circulation tanks 31L, 31R, and the dispersion liquid that has passed through the discharge chamber 42a to 42c and drained from the discharge chamber 42a to 42c is returned from the return line 38 to the main line 37, the dispersion liquid discharged from the discharge chamber 41a to 42c can be returned to the buffer tanks 41a to 42c.

The present invention can be applied to applicators discharging solutions (such as, pigment dispersion liquid inks for forming color filter, spacer dispersion liquids for forming spacers, solutions of which various functional solids such as conductive, dielectric, semiconductor, luminescent and electron-emitting materials, etc.). They can be used to coat the overall surfaces or discharge the solutions onto only predetermined positions to form patterns.

Applicators discharging spacers can also be used as spacer arrangement systems for placing a spacer between a color filter substrate and an array substrate of a liquid crystal display.

What is claimed is:

1. An applicator for allowing dispersion liquid of which solid microparticles are dispersed to be applied at a desired position on a substrate by relatively moving a head module and the substrate, comprising:

a head module for applying a liquid on a substrate;
first and a second circulation tanks placed outside the head module;
a buffer tank provided in the head module;
a discharge chamber having an inlet connected to the buffer tank;
a main line provided between the first and second circulation tanks and the buffer tank;
a return line provided between an outlet of the discharge chamber and the first and second circulation tanks;
a feed valve provided on the main line for connecting at least one of the first and second circulation tanks to the buffer tank; and
a return valve provided on the return line for connecting at least one of the first and second circulation tanks to the head module,
wherein the first and second circulation tanks and the buffer tank are hermetically sealed and the pressure of the space above the dispersion liquid placed in each of the tanks can be controlled, and further comprising a vacuum pump and a gas feeding system connected to the buffer tank in order to control the pressure of a space above the liquid level of the dispersion liquid in the buffer tank.

2. The applicator according to claim 1, wherein helium is supplied from the gas feeding system.

3. An applicator for allowing dispersion liquid of which solid microparticles are dispersed to be applied at a desired position on a substrate by relatively moving a head module and the substrate, comprising:

a head module for applying a liquid on a substrate;
first and a second circulation tanks placed outside the head module;
a buffer tank provided in the head module;
a discharge chamber having an inlet connected to the buffer tank;
a main line provided between the first and second circulation tanks and the buffer tank;
a return line provided between an outlet of the discharge chamber and the first and second circulation tanks;
a feed valve provided on the main line for connecting at least one of the first and second circulation tanks to the buffer tank; and
a return valve provided on the return line for connecting at least one of the first and second circulation tanks to the head module,
wherein the first and second circulation tanks and the buffer tank are hermetically sealed and the pressure of the space above the dispersion liquid placed in each of the tanks can be controlled, and
further comprising a transfer line provided between the first and second circulation tanks whereby the dispersion liquid can be transferred between the first and second circulation tanks without passing through the discharge chamber.

4. The applicator according to claim 3, further comprising a filter for separating clusters provided on the transfer line, which allows the individual solid microparticles to pass and catches clusters of the solid microparticles.

5. The applicator according to claim 3, further comprising a filter for removing solid microparticles on the transfer line, which catches the individual solid microparticles.

6. An applicator for allowing dispersion liquid of which solid microparticles are dispersed to be applied at a desired position on a substrate by relatively moving a head module and the substrate, comprising:

a head module for applying a liquid on a substrate;
first and a second circulation tanks placed outside the head module;
a buffer tank provided in the head module;
a discharge chamber having an inlet connected to the buffer tank;
a main line provided between the first and second circulation tanks and the buffer tank;
a return line provided between an outlet of the discharge chamber and the first and second circulation tanks;
a feed valve provided on the main line for connecting at least one of the first and second circulation tanks to the buffer tank; and
a return valve provided on the return line for connecting at least one of the first and second circulation tanks to the head module,
wherein the first and second circulation tanks and the buffer tank are hermetically sealed and the pressure of the space above the dispersion liquid placed in each of the tanks can be controlled, and
wherein at least a part of the lines through which the dispersion liquid is supplied from the circulation tanks to the discharge chamber comprises a double pipe having a liquid-impermeable and gas-permeable inner pipe through which the dispersion liquid passes, and a gas-impermeable outer pipe of which the inner pipe is inserted into, and a clearance between the inner pipe and the outer pipe can be evacuated.

* * * * *